United States Patent
Gaddy

(10) Patent No.: US 8,529,669 B2
(45) Date of Patent: Sep. 10, 2013

(54) METHOD AND APPARATUS FOR COLLECTING GREASE FROM A ROOFTOP EXHAUST FAN

(76) Inventor: Alan Warren Gaddy, Raleigh, NC (US)

( * ) Notice: Subject to any disclaimer, the term of this patent is extended or adjusted under 35 U.S.C. 154(b) by 479 days.

(21) Appl. No.: 12/359,795

(22) Filed: Jan. 26, 2009

(65) Prior Publication Data

US 2009/0301305 A1    Dec. 10, 2009

Related U.S. Application Data

(60) Provisional application No. 61/058,599, filed on Jun. 4, 2008.

(51) Int. Cl.
*B01D 39/00* (2006.01)

(52) U.S. Cl.
USPC .............. 95/273; 55/320; 55/422; 55/446; 55/508; 55/517; 96/135; 96/134; 96/139

(58) Field of Classification Search
USPC ............ 95/268–269, 273–274, 900; 55/337, 55/346, 466–467, 483–484, 486, 508, 516, 55/522–523, 323, 350.1, 511, 320, 321, 444, 55/446, 447, 517, 518, DIG. 36, 422; 96/135, 96/139, 134; 126/299 R; 454/149
See application file for complete search history.

(56) References Cited

U.S. PATENT DOCUMENTS

| | | | | |
|---|---|---|---|---|
| 134,700 A * | 1/1873 | Palmer | ............................ | 55/422 |
| 865,189 A * | 9/1907 | Lamb | ............................... | 55/482 |
| 949,432 A * | 2/1910 | Johnson | ........................... | 55/482 |
| 1,360,073 A * | 11/1920 | Backmire | ........................ | 96/416 |
| 1,377,694 A * | 5/1921 | Koehler | ........................... | 55/482 |
| 1,438,868 A * | 12/1922 | Shull et al. | ....................... | 55/505 |
| 1,509,724 A * | 9/1924 | Frame | .............................. | 55/418 |
| 1,620,266 A * | 3/1927 | McCarthy | ........................ | 55/482 |
| 1,846,475 A * | 2/1932 | Davenport | ....................... | 55/309 |
| 2,025,832 A * | 12/1935 | Slocum | ............................ | 55/505 |
| 2,505,123 A * | 4/1950 | Laffrey et al. | .................. | 55/496 |
| 2,598,603 A * | 5/1952 | Richtarsic | ........................ | 55/505 |
| 2,710,667 A * | 6/1955 | King et al. | ...................... | 55/418 |
| 3,952,640 A * | 4/1976 | Kuechler | .................. | 126/299 D |
| 4,635,617 A | 1/1987 | Simonsen | | |
| 4,869,236 A | 9/1989 | Blough | | |
| 4,887,588 A | 12/1989 | Rial | | |
| 5,453,049 A * | 9/1995 | Tillman et al. | ................. | 454/228 |
| 5,540,744 A * | 7/1996 | Renna | .............................. | 55/323 |
| 6,143,047 A * | 11/2000 | Jodoin et al. | .................... | 55/323 |
| 6,361,574 B1 * | 3/2002 | Decker | ............................ | 55/317 |
| 7,037,359 B1 | 5/2006 | McCauley | | |
| 7,041,159 B2 * | 5/2006 | Entezarian et al. | ............. | 96/135 |
| 2008/0245234 A1 * | 10/2008 | Baldwin et al. | ................. | 96/131 |

OTHER PUBLICATIONS

Pureair, PureAir Products, www.pureairco/products.html, Jul. 16, 2008, US.

* cited by examiner

*Primary Examiner* — Robert Clemente
*Assistant Examiner* — Karla Hawkins
(74) *Attorney, Agent, or Firm* — James G. Passé; Passé Intellectual Property, LLC

(57) ABSTRACT

The present invention relates to a method and device for the purpose of filtering particulate laden air exiting a rooftop from a commercial kitchen or other high particulate laden air exhaust. By positioning a filter at a distance from the air exhaust exit in such a manner that the air flow is reflected off the filter a substantial portion of the particulate matter is filtered out of the air without substantially obstructing the flow from the exhaust preventing problems that might be caused from creating back flow in an exhaust system.

18 Claims, 3 Drawing Sheets

METHOD AND APPARATUS FOR COLLECTING GREASE FROM A ROOFTOP EXHAUST FAN

This application claims priority over provisional patent application No. 61/058,599 filed on Jun. 4, 2008 and incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a device and method of filtering the exhaust from a commercial kitchen or other high particulate air exhaust. In particular, the present invention relates to a filtering device which is positioned in the exiting air flow of the exhaust of a commercial exhaust such that it filters a substantial portion of the particulate matter wherein there is no substantial obstruction of the flow from the exhaust.

2. Description of Related Art

Commercial kitchens that cook with grease, such as restaurants, use rooftop mounted exhaust systems during the cooking process. Air born grease generated during the cooking process is discharged up through the venting system. This venting system usually forces all the air through a washable metal filter, which particulate grease matter can condense on, before the air is discharged by the exhaust fan out the final exhaust port on the roof. The air filters used in commercial kitchens are metal, low back pressure, high volume air flow type filters because fine filters, as used in air conditioning systems, back-up air flow and prevent efficient exhaust of air. Filtration is not efficient with these types of filters when the air is saturated with grease or other particulate matter. The exhaust air in most commercial kitchens is so grease laden that a large percentage of the grease by-passes the filters and ends up ejected out the final exhaust roof port and distributed on the roof and any other area surrounding the final air exhaust port. This deposited grease builds up quickly causing a need for frequent roof cleanings and replacement of roofing materials, before their otherwise useful life ends. Where the grease is ejected far enough from the exhaust port it can damage near-by devices, such as HVAC and refrigeration units, on the roof and even be ejected off the roof damaging landscaping and anything unfortunate enough to be on the ground close to the building such as cars.

While currently there are many methods that attempt to deal with this issue, there is currently no solution that adequately solves the problem of air born grease or other particulate material which is discharged from a commercial kitchen exhaust or other rooftop exhaust. One method of attempting to fix this problem is to surround the area directly around the exhaust port with a material that is removable and replaceable. This approach wastes large areas of the roof preventing other uses of the roof and doesn't prevent wind or other interfering circumstances from depositing grease beyond where the material is placed. In addition, since the area of distribution of grease is generally large, such material is very costly to use and hold in place. Other methods usually involve creating convoluted air flow toward the exhaust outlet port in hopes of grease condensing on the exhaust path walls and doesn't prevent all grease from being thrown onto the surrounding roof area. This also requires frequent cleaning and adds to the problem of potential exhaust grease fires.

BRIEF SUMMARY OF THE INVENTION

The present invention solves the problems described above and more without backing grease into the ducting system or restricting fan performance or air flow out of the exhaust port. The present invention involves positioning a fiber filter material at an angle to the grease or other particulate laden exhaust air at a position such that exhaust air reflects off of the filter material before being discharged into the surrounding air. As the particulate laden air strikes the filter, the particles of grease or other particles are absorbed onto the filter and the resulting cleaned air reflects without creating backpressure in the duct work of the air exhaust system.

In one embodiment of the invention, there is a method of filtering particulate laden air exiting from a rooftop exhaust port comprising positioning a fibrous air filter in the path of the air after it leaves the exhaust port, at an angle less than 90 degrees to the direction of the exhaust air flow and in a position such that the exhaust air flow strikes the filter and is reflected off the filter in a manner that the flow of air is not significantly reduced from the exhaust port.

In yet another embodiment of the invention, there is an apparatus for filtering particulate laden air exiting from a rooftop exhaust port comprising a fibrous filtering material and a frame for holding the filter in the air flow of the exhaust port after it leaves the exhaust port at an angle to the direction of the exhaust air less than 90 degrees and in a position such that the exhaust air strikes the filter and is reflected off the filter in a manner that the flow of the air is not significantly reduced from the exhaust port.

DETAILED DESCRIPTION OF THE INVENTION

Figure 1:
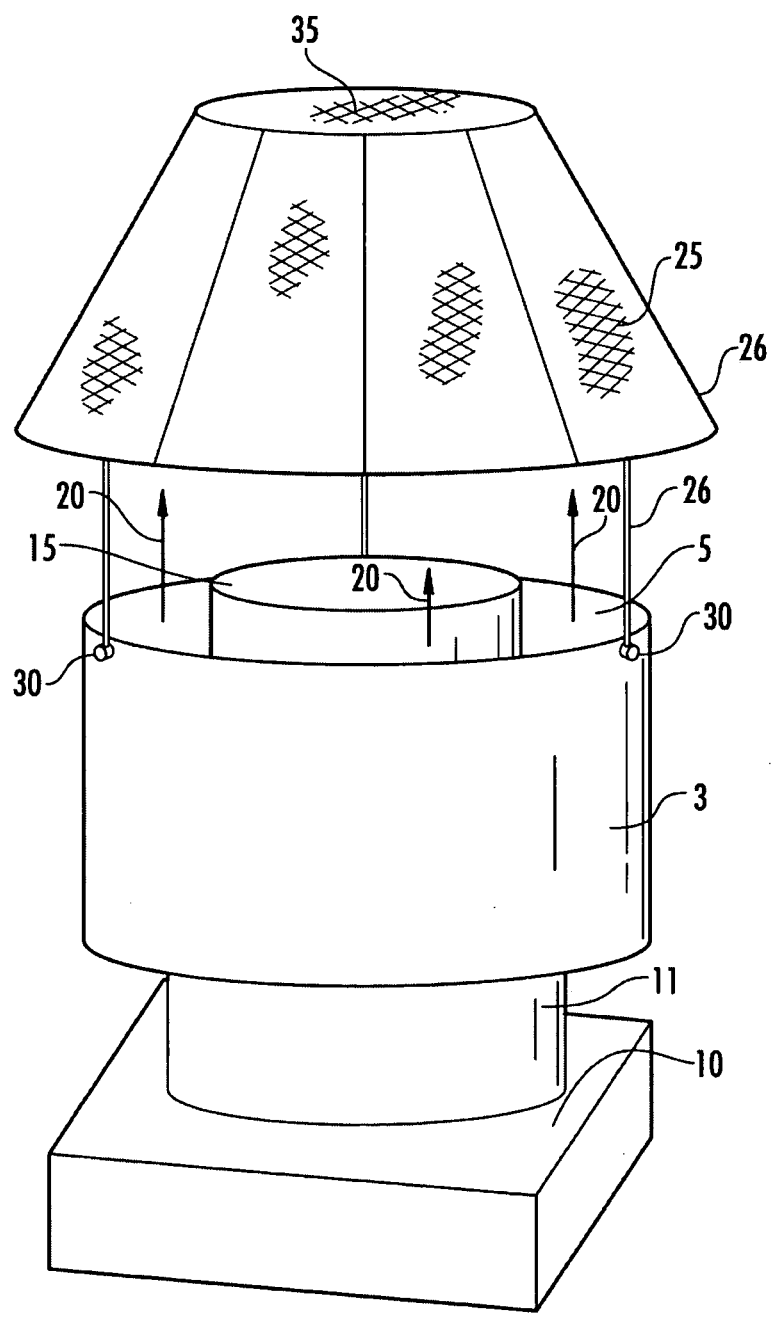
FIG. 1 is a perspective view of a lampshade style filter embodiment of the invention mounted on a circular exhaust port.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the phrase "substantially no obstruction to the flow of exhaust" refers to having little or no backpressure in the exhaust ducting so that flow from the exhaust is essentially not reduced based on the position or angle of the placement of the present invention air filtering system. As described in more detail herein the positioning is determined such that air flows through the filter or is essentially reflected off the filter.

As used herein the term "filtering" refers to the removal of unwanted particles in the air to be filtered. While passing air through a filter is one way of achieving such filtration the deflection of air off of filter material will also serve that purpose and should be understood from use of the word filtering. Particulate laden air refers to the particles which are suspended or otherwise carried in the air from the air filtration system exhaust such as would be the case with particles from exhaust air in a commercial kitchen. In a commercial kitchen, the particulate matter would be mostly oil or grease type particles but the particles could be any particles that the commercial exhaust system filtering had not caught in any rooftop filtering system that was ejected out the rooftop exhaust port.

As used herein "rooftop exhaust port" refers to the point in a commercial exhaust system such as in a commercial restaurant kitchen where the air leaves the system into the surrounding environment on the roof. The exhaust port is positioned on the roof along with fans, motors and the like. There may be condensation elements or other final filters as well before the air leaves the exhaust system out the exhaust port. In general, the direction of air leaving a commercial kitchen exhaust system is straight up. Although there is nothing preventing such a system from being vented at a different angle or the system of the present invention being used with air from such an angled air exhaust port. The shape of a rooftop exhaust port can vary with the design of the exhaust system being utilized but in general the port will be rectangular (even square), circular or in some cases the exhaust port is donut shaped in terms of the shape of the exhaust port final exit from the port. The photographs from the provisional application noted above are incorporated by reference and show such alternative exhaust ports.

As used herein a fibrous air filter is a filter that air can strike, pass through or both and remove particulate matter in the air, either by the action of filtration or the act of particulate matter condensation on the fibrous filter. The fibrous filter is made up of either a synthetic or a natural material that is woven, cast sprayed or the like, but has the ability to absorb or otherwise trap particulate matter as described herein and act as an air filter. Such filtering material is known and examples of such filter material include fiberglass, polyester, wool cotton, metal reusable, blends of different material and the like. The thickness of the material will depend on the particular material chosen but in general, the thickness will depend on the density of the material, the air flow speed and factors known to one skilled in the art. In one embodiment the filter is a woven synthetic material from about ½ to one inch to two and a half inches thick. One skilled in the art can easily choose a density for the invention as needed as well. Some embodiments of the invention have a density light enough that daylight is visible through the filter when held up to the light. In some embodiments between 1 and 60% of airflow will pass through the filter and the remaining air flow bounce off the filter. The angle and distance from the exit will determine many of these factors but one skilled in the art can easily optimize these choices in view of the present disclosure. The filter can be any shape which allows the air to strike the filter and reflect off the filter, so, for example, rectangular filters can be used over rectangular openings or round openings. A lamp shade shaped filter could be used over a donut shaped exhaust port. Other shapes can easily be designed in view of this disclosure with the shape of the exhaust port in mind. In one embodiment the surface of the filter is flat, while in yet other embodiments the surface of the filter may be curved. The filter can also have a tacky material applied to one surface or multiple surfaces to aid in holding the filter in place during installation and to help keep the filter in place during use. Any suitable adhesive material compatible with the filter material may be used such as spray adhesives.

As used herein the phrase "in the path of the air after it leaves the exhaust port" refers to the fact that air, when it leaves the exhaust port, has velocity and a direction. Until the energy of that air exiting the exhaust dissipates, there is air flow in the direction the exhaust is pointing and in a shape corresponding to the opening shape of the exhaust, rectangular, donut, etc. as described above. Once the momentum of the air dissipates, the air from the exhaust tends to be carried by the wind or otherwise combines with exterior air and adopts the air movement patterns of the surrounding environment.

The filter of the invention is positioned in the path of the air while it still has some velocity and momentum. It is clear that a filter could be placed covering part of the air path or could be positioned covering the entire air path. It could be placed parallel to the air flow, perpendicular or at an angle in between. In addition, the filter could be placed in part or wholly against the opening or far away from the opening preventing air flow. In the present invention, in order to prevent deleterious back pressure occurring from positioning a filter in the air path too close to the exhaust air, the present invention filter is placed with at least a portion of the filter away from the exhaust port and at an angle such that the air flow strikes the filter and the majority of air is reflected off the filter rather than passing entirely through the filter. Air striking the filter causes either filtration through the filter or deposition of the particulate matter on the filter as air is reflected off the filter. The exact angle and distance from the port will depend on the air flow pressure, the shape of the exhaust port, the speed of the air, and the like, but one skilled in the art with the information in the present invention could adjust angles and distance from the exhaust port in order to maximize particulate matter collection and prevent back pressure for each exhaust system the present invention is used on. In general, the filter will be angled at less than 90 degrees (or less than perpendicular) to the air flow and greater parallel to the air flow (greater than zero degrees). In one embodiment the angle is from about 5 degrees to about 85 degrees, in another embodiment from 20 to 75 degrees and in yet another embodiment, it is at an angle of from about 30 to about 60 degrees, and in yet another embodiment it is positioned from about 40 to 50 degrees. By positioning the filter in this manner, the flow of air is not significantly reduced, if at all, from the exhaust port. Likewise, the ideal filter size is one where the entire airflow strikes the filter so that a filter slightly larger than the airflow would guarantee the maximum amount of air striking the filter. Where room to place an exterior filter is an issue, a smaller filter could be used but the efficiency and ability to remove the particulate material will be eliminated for any air not striking or passing through the filter.

In general, the distance of the nearest edge to the exhaust port will be in the range of from touching to about a few inches to 10 or more feet. In one embodiment the distance of the closest edge is from about 0 inches to about 5 feet in yet another embodiment from about 0 inches to about 18 inches but that optimum will depend on the many factors outlined above. In determining these parameters two criteria can be used. The first is to position the filter such that no backflow is created. The second criteria is to maximize the filter catching as much of the grease as possible. Once the criteria are known then choosing the optimum parameters in view of this teaching herein is within the skill in the art.

Figure 2:
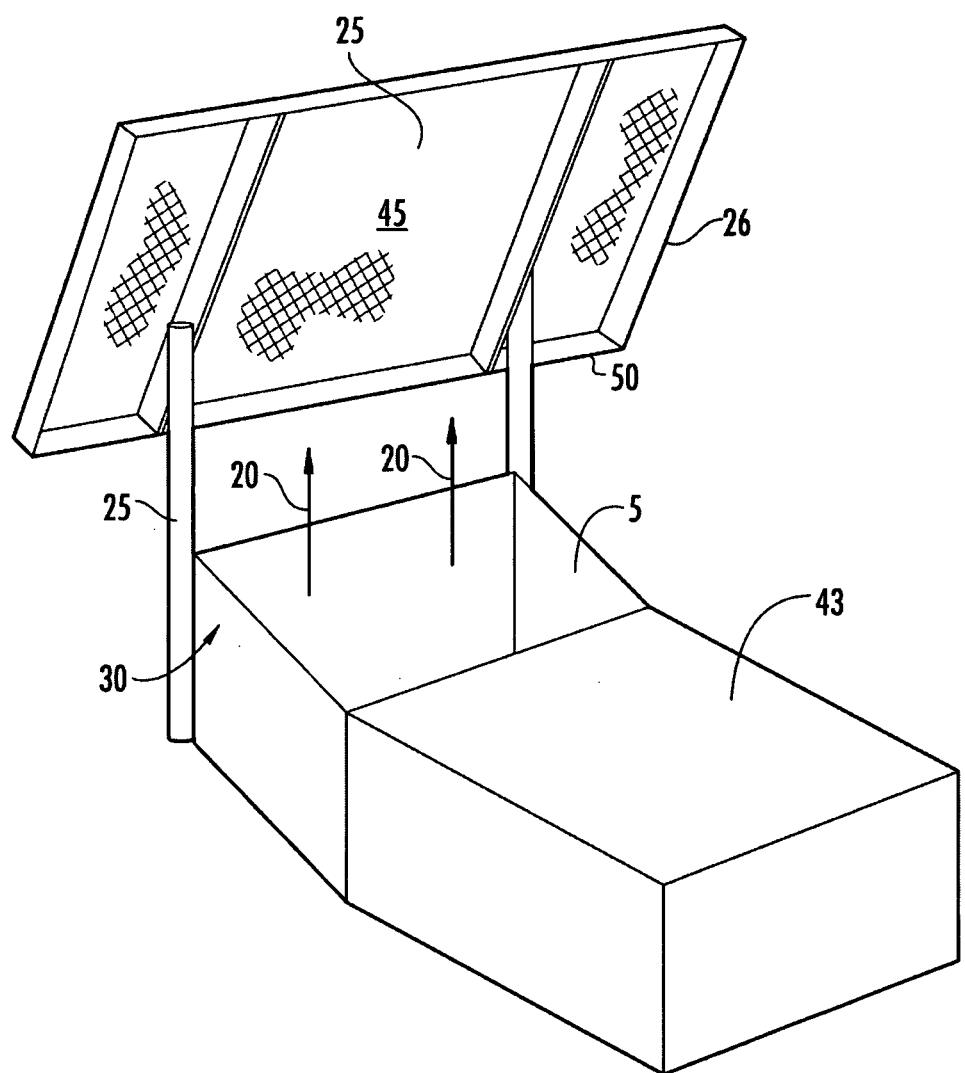
FIG. 2 is a perspective view of a rectangular filter embodiment of the invention mounted on a rectangular exhaust port.

The filter is held in place at the desired angle and the desired distance by use of a frame to hold the filter. The frame may be one piece or several pieces depending on the shape of the filter and the manner in which the filter is to be held as well as where and how it is to be mounted. The frame can hold the filter in place by any convenient means such as screws, clips, pressure from either side by the frame, by placing tacky material on the filter and the like. One skilled in the art could fashion frames of varying materials and shapes to hold the desired shape of filter in the pathway of the exhaust. Such materials include metals such as wires and flat stock such as stainless steel aluminum iron alloys and the like, wood, plastic, fibrous natural and synthetic materials, and the like. The frame also consists of a mounting capability so that it holds it in place by mounting to the exhaust, the roof or any other fixed object as desired. While less desirable the frame could sit on the roof or exhaust and stay in place merely by gravity or the like. While functional, such a frame would need to be heavy enough to compensate for weather conditions. In one embodiment the frame is screwed or riveted onto the exhaust to be held in place, for example as shown in FIGS. 1 and 2.

In the practice of the method of the invention one positions the filter in the air pathway of the exhaust air as described above to collect and filter the particulate material. As the filter becomes saturated with particulate material the filter is removed and either cleaned or, in the case of non cleanable filtering material, merely replaced with a new filter.

Now referring to the drawings, the reader is encouraged to review the photographs from the provisional application incorporated herein by reference for a view of the present device in a research working example. FIG. 1 depicts the device of the present invention wherein there is a donut shaped exhaust port 5. The exhaust fan housing 3 sits on a roof curb 10 and shows a portion of the air conduit 11 which widens at the exhaust port 5. Shown in this embodiment is a motor housing 15 which is a standard item on air handling exhaust systems from commercial restaurants and thus creates the donut shaped air flow 20.

In this embodiment, a lampshade shaped air filter 25 is held in place in the air flow 20 by filter frame 26 which has screw mountings 30 which attach it to the exhaust 3. The air flow 20 strikes the inner surface (not shown) of the lampshade filter 25 and is channeled out opening 35 creating little or no back flow to air flow 20. Particulate matter is caught by striking the filter or by the air that does pass through the filter.

FIG. 2 depicts a simpler embodiment of the present invention. A commercial kitchen fan motor housing 43 has exhaust port 5. In this embodiment filter 25 is rectangular to match the rectangular exhaust port 5. This embodiment has air flow 20 strike filter surface 45 and reflect off of it. In the particular embodiment, the filter is held at about a 45 degree angle and the air flow 20 reflects off of the filter 25 and away from the exhaust port 5 after removing a substantial amount of the particulate matter from the air flow. Note that the lower lip 50 of the frame 26 and filter 25 is roughly parallel to the edge of the exhaust and as such that edge 50 is in all cases about the same distance from the exhaust port 5. In the example that edge is about 12 to 18 inches away but as described above that can vary depending on numerous factors.

Figure 3:
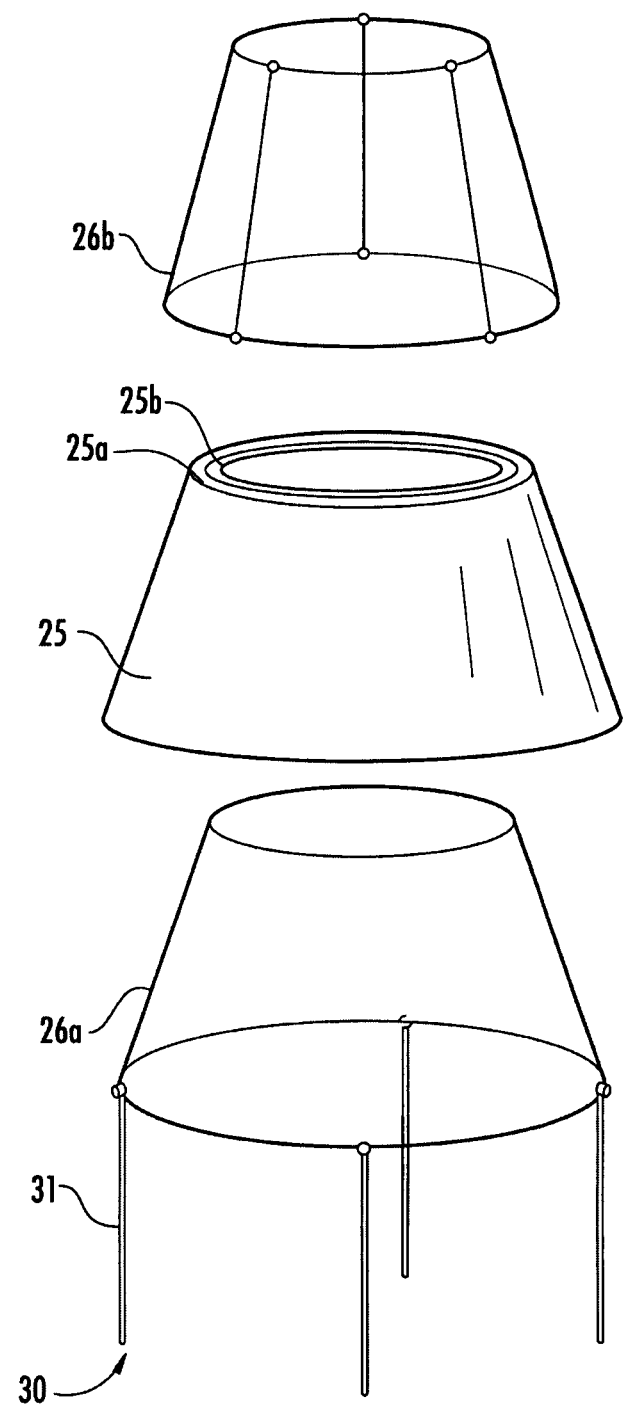
FIG. 3 is an exploded view of an embodiment of the invention.

FIG. 3 is an exploded view of one of the embodiments of the present invention. This is an embodiment that is similar to the drawings incorporated by reference from the provisional application herein. This drawing shows the filter and filter holder not mounted to a commercial air flow outlet. In this embodiment air filter 25 of the lampshade shape is shown with the two parts of the filter holder parts 26a and 26b. The filter in this embodiment is a two layer filter 25a and 25b which represent an inner and outer filter. A layer of adhesive is placed in between the two layers to keep them in register and from moving in the holder. Filter holder part 26a is the lower portion of the filter holder and has screw mountings 30 and legs 31 for mounting on an exhaust. The filter 25 is placed on the 26a part of the frame and can be held in place by an adhesive or gravity or the like. In some embodiments a second piece of filter material can be used and again held in place by an adhesive material or the like. Multiple layers that are two or more layers of filters are also within the contemplation of this invention. Finally, outer frame 26b is placed over filter 25 to hold the filter in place by gravity screws bolts or the like. In replacing the filter or removing it for cleaning outer frame 26b is removed then the filter. The lower frame part 26a remains attached. Thus this embodiment saves time and energy by not having to remove the entire frame each time the filter needs changing.

Again one skilled in the art in view of these examples and the descriptions of the invention can easily make substitutions of the various elements and the claims which follow should so be interpreted with the examples and are not intended in any way to be limiting.

What I claim is:

1. A method of cleaning particulate laden air flow from a forced air ventilation system as it exits from a rooftop exhaust port into the environment comprising positioning an unenclosed absorbent air filter in the path of the forced air flow it exits from the exhaust port into the environment, at an angle less than 90 degrees to the direction of the exiting exhaust air flow and in a position such that at least a portion of the exhaust air flow strikes the filter and is reflected off the filter into the environment in a manner that the flow of air is not significantly reduced as it exits from the exhaust port into the environment while particulate matter is absorbed on the filter from the air that is reflected off the filter.

2. A method according to claim 1 wherein the filter is made of a polyester filter material.

3. A method according to claim 1 wherein a closest portion of the filter to the exhaust port is positioned at a distance of from about 0 inches to 5 feet.

4. A method according to claim 1 wherein the filter is positioned at an angle of from about 5 degrees to about 85 degrees relative to air flowing from the exhaust port.

5. A method according to claim 4 wherein the filter is positioned at an angle of from about 30 degrees to about 60 degrees.

6. A method according to claim 1 wherein the filter is held by a filter holder mounted to the exhaust port.

7. A method according to claim 1 wherein the particulate matter is grease.

8. An apparatus for filtering particulate laden air as it exits from a rooftop exhaust port into the environment comprising an unenclosed fibrous filtering material and a frame holding the filter in the air flow path of the exhaust port as it leaves the exhaust port into the environment the frame holding the filter at an angle to the direction of the exhaust air flow less than 90 degrees and in a position such that the exhaust air strikes the filter as it exits the exhaust port and at least a portion of the exhaust is reflected off the filter in a manner that the flow of the air is not significantly reduced from the exhaust port.

9. An apparatus according to claim 8 wherein the filter is positioned from about 0 inches to about 5 feet from the exhaust.

10. An apparatus according to claim 8 wherein the filter is positioned from about 5 degrees to about 85 degrees relative to the direction of the exhaust air flow.

11. An apparatus according to claim 10 wherein the filter is positioned from about 30 to about 60 degrees relative to the direction of the exhaust air flow.

12. An apparatus according to claim 8 wherein the size of the filter is selected to match the size of the air flow exiting the exhaust port.

13. An apparatus according to claim 12 wherein the filter is rectangular shaped.

14. An apparatus according to claim 8 wherein the filter is lamp shade shaped to match a circular exhaust port.

15. An apparatus according to claim 8 wherein the filter holder is adapted to attach to a portion of a roof top exhaust.

16. An apparatus according to claim 8 wherein the filter material is selected from group consisting of fiberglass and polyester air filters.

17. An apparatus according to claim 8 wherein there is an adhesive applied to the air filter to help hold it in place.

18. An apparatus according to claim 8 where in the filter is two or more layers.

* * * * *